3,816,430
N,N' - (NAPHTHYLENEDIOXYDIETHYLENE)BIS [DI(LOWER)ALKYLAMINES] AND THE SALTS THEREOF

Arthur A. Santilli, Havertown, Anthony C. Scotese, King of Prussia, and Stanley C. Bell, Penn Valley, Pa., assignors to American Home Products Corporation, New York, N.Y.
No Drawing. Filed Oct. 30, 1972, Ser. No. 302,379
Int. Cl. C07c 93/06
U.S. Cl. 260—570.7         4 Claims

ABSTRACT OF THE DISCLOSURE

N,N' - (naphthylenedioxydiethylene)bis[di(lower)alkylamines] have anti-inflammatory activity.

---

This invention relates to new and pharmacologically active N,N' - (naphthylenedioxydiethylene)bis[di(lower)alkylamines]. German Pat. 1,056,144 (1959) describes 2-[2-(diethylamino)ethoxy]naphthylene.

The invention sought to be patented comprises chemical compounds selected from the group consisting of:

(a) a disubstituted naphthylene in which one substituent is a 2-[di(lower)alkylamino]ethoxy group substituted in the 1-position and the other substituent is the same 2-[di(lower)alkylamino]ethoxy group substituted in either the 5-, 6-, 7-, or 8-position; and (b) a disubstituted naphthylene in which one substituent is a 2-[di(lower)alkylamino]ethoxy group substituted in the 2-position and the other substituent is the same 2-[di(lower)alkylamino]ethoxy group substituted at either the 6- or 7-position;

and the non-toxic, pharmacologically acceptable acid addition salts thereof.

As used herein and in the claims, "lower alkyl" means the methyl, ethyl, and propyl groups. "Halo" means a chloro, bromo, or iodo atom.

The new compounds sought to be patented possess anti-inflammatory activity as demonstrated by evaluation in standard pharmacological test procedures.

In the testing of the compounds, adjuvant-induced arthritis is induced in rats by injection of dead mycobacteria into the hind footpad. The test compound is administered orally daily for sixteen consecutive days beginning with the day of injection. The injected foot swells rapidly during the first 4 to 6 days. Thereafter, the swelling subsides until the 8th day, and then it resumes. About 4 to 10 days after injection, the other hind paw (un-injected) becomes swollen and other inflammatory nodules may be found in the ear and tail. The swelling of the injected paw at day 4 is taken as an indication of an acute inflammatory response. The swelling of the same paw at day 16 is taken as a delayed inflammatory response. The swelling of the other hind paw at day 16 is taken as a delayed hypersensitivity reaction. Active compounds reduce the swelling in either the acute and/or the delayed phases. Steroidal and non-steroidal anti-inflammatory agents reduce swelling in the acute and/or the delayed phase, while immunosuppressives reduce swelling only in the delayed phase. The percent protection against swelling, as compared to non-treated controls, is calculated and is used as a measure of anti-inflammatory activity. When tested in the above-described manner, the compounds reduced the swelling of adjuvant-induced arthritis in rats, at a daily dose of 75 mg./kg. (body weight).

The new N,N' - (naphthylenedioxydiethylene)bis[di(lower)alkylamines] can be prepared by treating a dihydroxynaphthylene with a haloethyldi(lower)alkylamine in the presence of a strong base, e.g. 50% aqueous sodium hydroxide, in a non-reactive solvent, such as benzene or xylene. The mixture is heated under reflux for from one to about twenty-four hours, preferably six hours, while water is removed by distillation. The product is isolated by conventional means. The product can be obtained as a free base or it can be converted into the acid addition salt thereof by contacting the base in an inert solvent with a suitably strong non-toxic, pharmacologically acceptable acid. Suitable acids are hydrochloric, hydrobromic, sulfuric, methanesulfonic, p-toluenesulfonic, maleic, tartaric, or succinic and the like.

The manner and process of making and using the compounds of the invention are illustrated in the following examples, wherein all temperatures are given in degrees centigrade.

EXAMPLE I 2,2'''-[(2,6-Naphthylene)Dioxy]Bistriethylamine, Dihydrochloride

A stirred mixture of 19.6 g. of 2,6-dihydroxynaphthylene, dihydrate, 27.0 g. of 2-diethylaminoethyl chloride and 16.0 g. of 50% sodium hydroxide in 500 ml. of xylene is heated under reflux for 6 hours while water is removed by azeotropic distillation. The reaction mixture is filtered and the filtrate extracted with 300 ml. of 10% hydrochloric acid solution. The water layer is basified to pH 9 with concentrated ammonium hydroxide and extracted with 300 ml. of ether. The ether solution is dried over magnesium sulfate and acidified with alcoholic hydrochloric acid solution. The resulting precipitate is collected and recrystallized from ethanol-ether to give 8.3 g. of the title compound, M.P. 239–243° d.

*Analysis.*—Calculated for $C_{22}H_{36}N_2O_2Cl_2$: C, 61.24; H, 8.41; N, 6.49. Found: C, 61.57; H, 8.29; N, 6.19.

EXAMPLE II 2,2'''-[(2,7-Naphthylene)Dioxy]Bistriethylamine, Dihydrochloride

A stirred mixture of 16.0 g. of 2,7-dihydroxynaphthylene, 27.0 g. of 2-diethylaminoethyl chloride and 16.0 g. of 50% sodium hydroxide in 500 ml. of xylene is heated under reflux for 6 hours while water is removed by azeotropic distillation. The reaction mixture is filtered and the filtrate extracted with 300 ml. of 10% hydrochloric acid solution. The water layer is basified to pH 9 with concentrated ammonium hydroxide and extracted with 300 ml. of ether. The ether solution is dried over magnesium sulfate and acidified and alcoholic hydrochloric acid solution. The resulting precipitate is collected and recrystallized from ethyl acetate-ethanol to give 6.9 g. of the title compound, M.P. 164–168° d.

*Analysis.*—Calculated for $C_{22}H_{36}N_2O_2Cl_2$: C, 61.24; H, 8.41; N, 6.49. Found: C, 60.90; H, 8.52; N, 6.60.

EXAMPLE III 2,2'''-[(1,5-Naphthylene)Dioxy]Bistriethylamine, Dihydrochloride A stirred mixture of 16.0 g. 1,5-dihydroxynaphthylene, 27.0 g. of 2-diethylaminoethyl chloride and 16.0 g. of 50% sodium hydroxide in 500 ml. of xylene is heated under reflux for 6 hours while water is removed by azeotropic distillation. The reaction mixture is filtered and the filtrate extracted with 300 ml. of 10% hydrochloric acid solution. The water layer is basified to pH 9 with concentrated ammonium hydroxide. The resulting precipitate is collected and dissolved in ether. The ethereal solution is acidified with gaseous hydrochloric acid. The precipitate thus formed is collected and recrystallized from ethanol-ether is given 4.5 g. of the title compound, M.P. 276–279° d.

*Analysis.*—Calculated for $C_{22}H_{36}N_2O_2Cl_2$: C, 61.24; H, 8.41; N, 6.49. Found: C, 61.28; H, 8.66; N, 6.46.

EXAMPLE IV

The *in vivo* anti-inflammatory activity of the compounds is elicited and demonstrated by employing the following procedures:

Male rats are randomly dispersed into groups. One group is injected with a mineral oil suspension of heat-killed tubercle bacilli in subplantar portion of the right hind paw (day 0). On the same day, a single dose of the test compound, in aqueous suspension containing Tween 80, is administered orally by means of a metal feeding tube. Groups of normal and positive arthritis rats are given vehicle only. Each rat is given a single dose daily for a total of sixteen days. On day 4, the volume of the injected (right) foot is measured by means of a mercury plethysmograph. On day 16, the volumes of both the injected, right foot and the left hind foot are measured. The ability of the test compound to protect against acute and delayed swelling is measured by calculating the percent decrease in volume of the test animals as compared to controls. When tested by the above procedures, the following compounds gave results as follows:

Compound A: 2,2'''-[(2,6-naphthylene)dioxy]bistriethylamine, dihydrochloride

Compound B: 2,2'''-[2,7-naphthylene)dioxy]bistriethylamine, dihydrochloride

Compound C: 2,2'''-[(1,5-naphthylene)dioxy]bistriethylamine, dihydrochloride

RESULTS

| Compound: | Daily oral dose (mg./kg.) | Percent inhibition of swelling | | |
|---|---|---|---|---|
| | | Day 4, rt. paw | Day 16 Rt. paw | Day 16 L. paw |
| A | 75 | 7 | 64 | 82 |
|   | ¹75 | 51 | 74 | 98 |
| B | 75 | 13 | 46 | 57 |
| C | 75 | 22 | 50 | 82 |
|   | 25 | 0 | 15 | 19 |

¹ Repeat experiment.

When the compounds of the invention are employed as anti-inflammatory agents, they may be administered alone or in combination with pharmaceutically acceptable carriers, the proportion of which is determined by the solubility and chemical nature of the compound, chosen route of administration, and standard pharmaceutical practice. For example, they may be administered orally in the form of tablets or capsules containing such excipients as starch, lactose, magnesium stearate, and so forth. They may be administered orally in the form of solution or they may be injected parenterally, e.g. intramuscularly. For parenteral administration, they may be used in the form of a sterile solution or suspensions containing other solutes, for example, enough saline or glucose to make the solution isotonic.

The dosage of the present pharmacologically active agents will vary with the form of administration and the particular compound chosen. Furthermore, it will vary with the particular subject under treamtent. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a dosage level that will generally afford effective results without causing any harmful or deleterious side effects.

What is claimed is:

1. A compound selected from the group consisting of:
   (a) a disubstituted naphthylene in which one substituent is a 2-[di(lower)alkylamino]ethoxy group substituted in the 1-position and the other substituent is the same 2-[di(lower)alkylamino]ethoxy group substituted in either the 5-, 6-, 7-, or 8-position; and
   (b) a disubstituted naphthylene in which one substituent is a 2-[di(lower)alkylamino]ethoxy group substituted in the 2-position and the other substituent is the same 2-[di(lower)alkylamino]ethoxy group substituted at either the 6- or 7-position; and the nontoxic, pharmacologically acceptable acid addition salts thereof.

2. The compound as defined in claim 1 which is 2,2'''-[(2,6 - naphthylene)dioxy]bistriethylamine, dihydrochloride.

3. The compound as defined in claim 1 which is 2,2'''-[(2,7 - naphthylene)dioxy]bistriethylamine, dihydrochloride.

4. The compound as defined in claim 1 which is 2,2'''-[(1,5 - naphthylene)dioxy]bistriethylamine, dihydrochloride.

References Cited

FOREIGN PATENTS 1,056,144   10/1959   Germany _____ 260—570.7

ROBERT V. HINES, Primary Examiner

U.S. Cl. X.R.

260—501.18, 501.19; 424—316, 330